US009485221B2

(12) United States Patent
Balasubramanian et al.

(10) Patent No.: US 9,485,221 B2
(45) Date of Patent: Nov. 1, 2016

(54) SELECTIVE CONTENT CLOUD STORAGE WITH DEVICE SYNCHRONIZATION

(71) Applicant: International Business Machines Corporation, Armonk, NY (US)

(72) Inventors: Swaminathan Balasubramanian, Southfield, MI (US); Brian M. O'Connell, Cary, NC (US); Cheranellore Vasudevan, Bastrop, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 14/521,850

(22) Filed: Oct. 23, 2014

(65) Prior Publication Data

US 2016/0119290 A1    Apr. 28, 2016

(51) Int. Cl.
| | |
|---|---|
| *G06F 21/60* | (2013.01) |
| *H04L 29/06* | (2006.01) |
| *G06F 17/30* | (2006.01) |
| *G06F 21/62* | (2013.01) |
| *G06F 21/00* | (2013.01) |

(52) U.S. Cl.
CPC ......... *H04L 63/04* (2013.01); *G06F 17/30356* (2013.01); *G06F 17/30887* (2013.01); *G06F 21/00* (2013.01); *G06F 21/60* (2013.01); *G06F 21/6245* (2013.01); *G06F 21/6254* (2013.01)

(58) Field of Classification Search
CPC ..................................................... G06F 21/60
See application file for complete search history.

(56) References Cited

U.S. PATENT DOCUMENTS

| | | | |
|---|---|---|---|
| 5,497,421 A | 3/1996 | Kaufman et al. | |
| 7,054,905 B1 * | 5/2006 | Hanna | G06Q 10/107 709/206 |
| 8,260,272 B2 | 9/2012 | Karkanias et al. | |
| 8,296,178 B2 | 10/2012 | Hudis et al. | |
| 2002/0049828 A1 * | 4/2002 | Pekarek-Kostka | H04L 29/06 709/217 |
| 2006/0075228 A1 * | 4/2006 | Black | H04L 63/0428 713/167 |
| 2009/0300721 A1 * | 12/2009 | Schneider | H04L 63/029 726/3 |
| 2010/0208889 A1 * | 8/2010 | Humphrey | G06F 21/602 380/44 |
| 2010/0268966 A1 | 10/2010 | Leggette et al. | |
| 2010/0325422 A1 * | 12/2010 | Gnanasambandam | G06F 17/30082 713/153 |

(Continued)

OTHER PUBLICATIONS

Cadenhead et al., "Design and Implementation of a Cloud-Based Assured Information Sharing System", 2012, pp. 36-50.*

(Continued)

*Primary Examiner* — Thanhnga B Truong
*Assistant Examiner* — Thaddeus Plecha
(74) *Attorney, Agent, or Firm* — Patrick J. Daugherty; Driggs, Hogg, Daugherty & Del Zoppo Co., LPA (57) ABSTRACT

Programmable devices selectively allocate file content portions between cloud and secured hardware device storage mediums. A confidential portion of a first file is stored as a second file on a first device, and a remainder portion of content of the first file that is different from the confidential portion and is not designated as confidential is stored on a cloud storage system. A uniform resource indicator is generated that includes a routing identifier to the first device, and a section routing identifier to the second file stored on the first device. A revised version of the first file is stored to the cloud storage system wherein the confidential portion of the first file is replaced with the generated uniform resource indicator within the revised version of the first file at a location of the confidential portion within the content of the first file.

16 Claims, 4 Drawing Sheets

(56) References Cited

U.S. PATENT DOCUMENTS

| | | | | |
|---|---|---|---|---|
| 2011/0040983 A1* | 2/2011 | Grzymala-Busse | G06F 21/6245 | 713/189 |
| 2013/0024769 A1* | 1/2013 | Sumida | G06F 17/00 | 715/255 |
| 2014/0259132 A1* | 9/2014 | Gough | H04L 63/0823 | 726/6 |
| 2015/0288522 A1* | 10/2015 | McCoy | H04L 9/3234 | 726/9 |

OTHER PUBLICATIONS

IBM, A system and method for peer-to-peer content distribution in a weakly connected and heterogeneous personal area network, Oct. 15, 2008, IPCOM000175610D, 8 pp.

Internet Society, R. Alimi and A. Rahman, A Survey of In-Network Storage Systems (RFC6392), Oct. 1, 2011, IP.com Prior Art Database Technical Disclosure, 89 pp.

Sandesh Uppoor et al, Cloud-based Synchronization of Distributed File System Hierarchies, 2010, IEEE, 4 pp.

Bagci et al, Codo: Confidential Data Storage for Wireless Sensor Networks, 2012, 6 pp.

Shucheng Yu et al, Achieving Secure, Scalable, and Fine-grained Data Access Control in Cloud Computing, 2010, IEEE, 9 pp.

Brian Warner et al, Tahoe: A Secure Distributed Filesystem, Jun. 3, 2014, 17 pp.

Sameer Pawar et al, Securing Dynamic Distributed Storage Systems against Eavesdropping and Adversarial Attacks, Apr. 27, 2011, IEEE, 19 pp.

* cited by examiner

SELECTIVE CONTENT CLOUD STORAGE WITH DEVICE SYNCHRONIZATION

TECHNICAL FIELD

The present patent application is directed to automated devices and processes that identify, save and grant access to confidential portions of file contents as distinguished from differential levels of access provided to other, non-confidential portions of the file contents as a function of user and device security settings and storage medium location.

BACKGROUND

Cloud computing refers to World Wide Web-based processing, whereby shared resources, software, and information are provided to computers and other devices on demand over the Internet. Cloud computing is a natural evolution of the widespread adoption of virtualization, Service-Oriented Architecture (SOA), and utility computing. Details are abstracted from consumers, who no longer have need for expertise in, or control over, the technology infrastructure "in the cloud" that supports them.

Cloud computing describes a new supplement, consumption, and delivery model for Information Technology (IT) services based on the Internet, and it typically involves over-the-Internet provision of dynamically scalable and often virtualized resources. It is a by-product and consequence of the ease-of-access to remote computing sites provided by the Internet. This frequently takes the form of web-based tools or applications that users can access and use through a web browser as if it was a program installed locally on their own computer. Typical cloud computing providers deliver common business applications online which are accessed from another Web service or software like a Web browser, while the software and data are stored on servers.

BRIEF SUMMARY

In one aspect of the present invention, a method for the selective allocation of file content portions between cloud and secured hardware device storage mediums includes a hardware controller, a first device component that is in network communication with a cloud storage system storing a confidential portion of a first file as a second file on the first device, and a remainder portion of content of the first file that is different from the confidential portion and is not designated as confidential on the cloud storage system. A uniform resource indicator is generated that includes a routing identifier to the first device, and a section routing identifier to the second file stored on the first device. A revised version of the first file is stored to the cloud storage system wherein the confidential portion of the first file is replaced with the generated uniform resource indicator within the revised version of the first file at a location of the confidential portion within the content of the first file.

In another aspect, a method provides a service for the selective allocation of file content portions between cloud and secured hardware device storage mediums. Said method includes integrating computer readable program code into a computer readable tangible storage medium in communication with a processor of a hardware controller of a first device. Computer readable program code is embodied on the computer readable tangible storage medium and includes instructions that, when executed by the processor via a computer readable memory, cause the processor to store a confidential portion of a first file as a second file on the first device, and a remainder portion of content of the first file that is different from the confidential portion and is not designated as confidential on the cloud storage system. The processor is further caused to generate a uniform resource indicator which includes a routing identifier to the first device, and a section routing identifier to the second file stored on the first device. A revised version of the first file is stored to the cloud storage system wherein the confidential portion of the first file is replaced with the generated uniform resource indicator within the revised version of the first file at a location of the confidential portion within the content of the first file.

In another aspect, a system has a processor on a first device component that is in network communication with a cloud storage system, a computer readable memory and a computer readable storage medium with program instructions. The processor, when executing program instructions stored on the computer readable storage medium, stores a confidential portion of a first file as a second file on the first device, and a remainder portion of content of the first file that is different from the confidential portion and is not designated as confidential on the cloud storage system. The processor generates a uniform resource indicator which includes a routing identifier to the first device, and a section routing identifier to the second file stored on the first device. A revised version of the first file is stored to the cloud storage system wherein the confidential portion of the first file is replaced with the generated uniform resource indicator within the revised version of the first file at a location of the confidential portion within the content of the first file.

In another aspect, a computer program product has a computer readable storage medium with computer readable program code embodied therewith, the computer readable program code including instructions that, when executed by a computer processor on a first device in communication with a cloud storage system, cause the computer processor to store a confidential portion of a first file as a second file on the first device, and a remainder portion of content of the first file that is different from the confidential portion and is not designated as confidential on the cloud storage system. The processor is thereby caused to generate a uniform resource indicator which includes a routing identifier to the first device, and a section routing identifier to the second file stored on the first device. A revised version of the first file is stored to the cloud storage system wherein the confidential portion of the first file is replaced with the generated uniform resource indicator within the revised version of the first file at a location of the confidential portion within the content of the first file.

BRIEF DESCRIPTION OF THE SEVERAL VIEWS OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
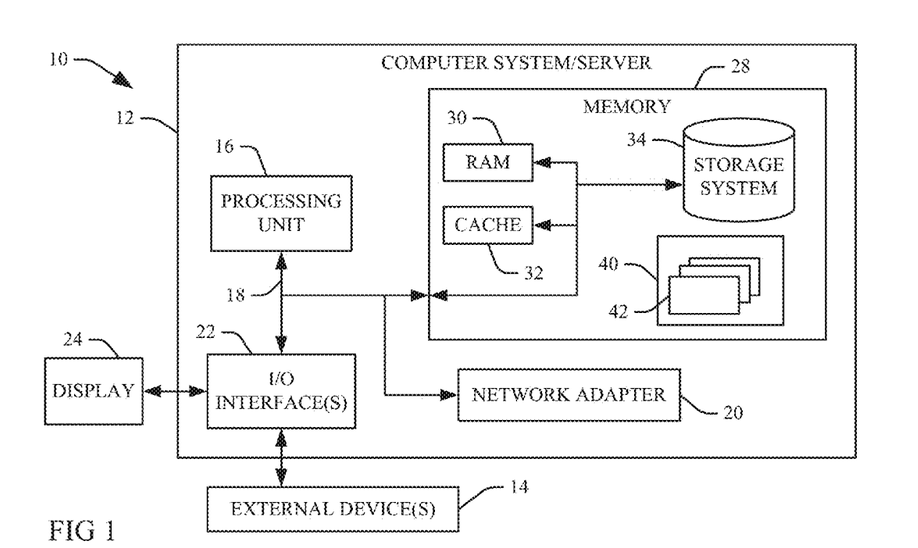
FIG. 1 depicts a cloud computing node according to an embodiment of the present invention.

Referring now to Figure ("FIG.") 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
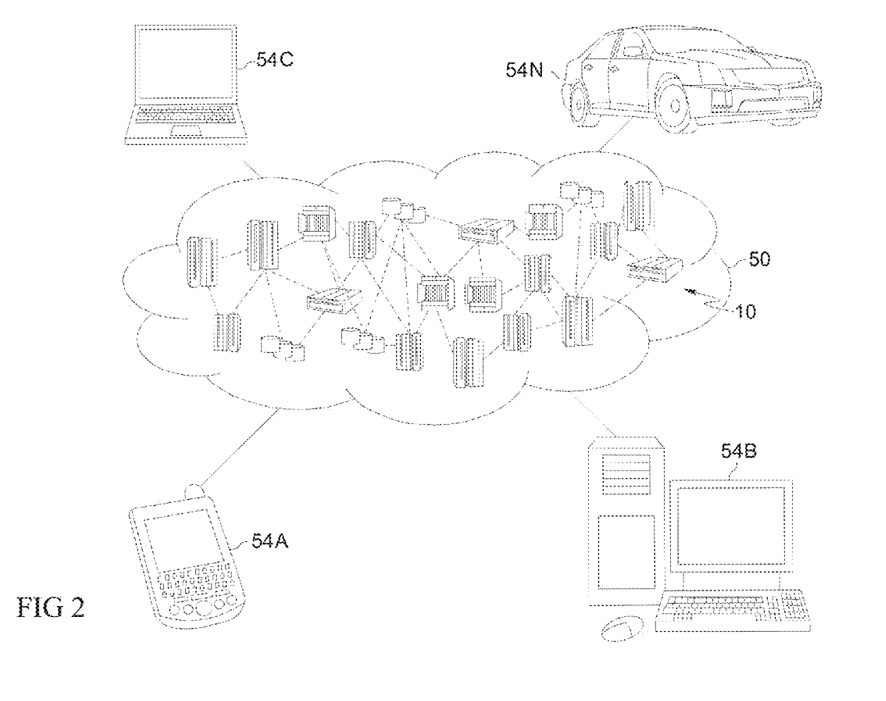
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
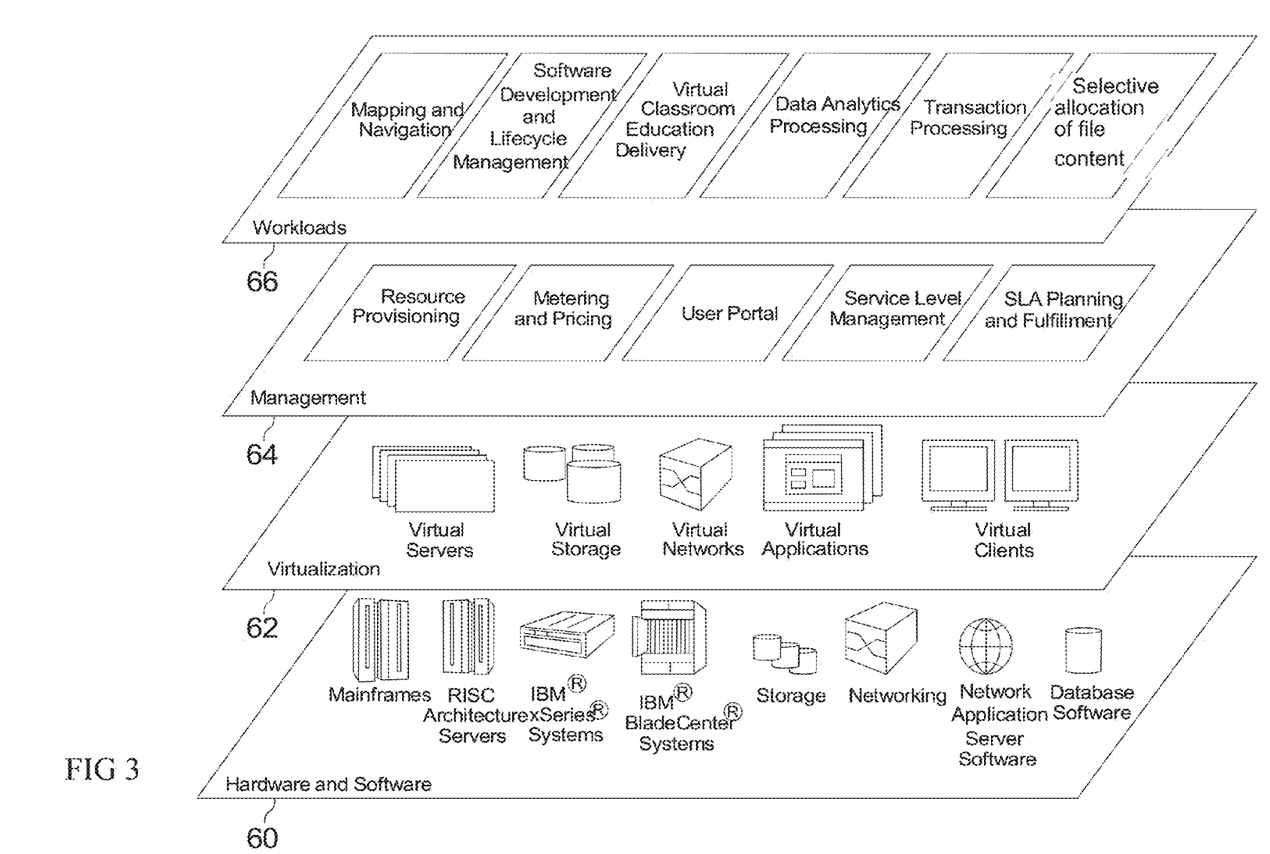
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and selective allocation of file content portions between cloud and hardware device storage mediums (as described more particularly below).

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

Prior art methods and processes for storing data items in the cloud do not permit users to store some content in cloud storage while storing other content on a secure device or other tangible hardware storage system, while also enabling the transfer of said secure content to other authorized devices upon demand. In contrast, aspects of the present invention provide methods, processes, systems and programmable devices that enable cloud storage of some portions of item content (for example, a specific document, database file, image file, etc.) while further enabling users to store other specified or designated portions of the item elsewhere, not in the cloud but on storage medium hardware of a designated (and optionally authorized) device.

Aspects provide utility where the specified or designated portions of the item not stored on the cloud include content that is confidential and should not be stored on the cloud, while allowing remainder, non-confidential portions of the content to be stored in the cloud. According to some aspects, a secondary device may retrieve documents from cloud storage and then resolve confidential portions of that document from another device. In this fashion, cloud storage can be used without compromising security, while enabling cloud documents to be fully reconstructed using only secure or authorized devices.

Figure 4:
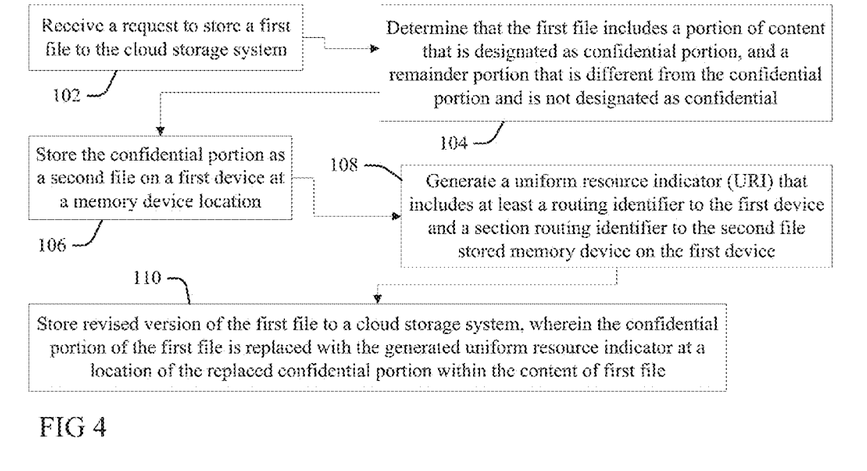
FIG. 4 is a flow chart illustration of a method or process for the selective allocation of file content portions between cloud systems and hardware storage devices.

FIG. 4 illustrates a method or process aspect according to the present invention for the selective allocation of file content portions between cloud and hardware device storage mediums. At 102 a hardware controller (for example, a hardware processor executing instructions from a memory in circuit communication therewith, or other hardware device component) of a first programmable device that is in network communication with a cloud storage system receives a request to store a first file to the cloud storage system.

At 104 the hardware controller determines that the first file includes a portion of content of file that is designated as confidential (the "confidential portion"), and a remainder portion of content of the first file that is different from the confidential portion and is not designated as confidential (the "remainder portion"). The file content of the remainder portion need not be all of the content portions of the file that remain when the confidential portion content is excluded from consideration, but it is different from and separate from the confidential portion content.

At 106 the hardware controller stores the confidential portion of the first file as a second file on the first device, at a location of a memory device of the first programmable device that is in circuit communication with the hardware processor. At 108 the hardware controller generates a uniform resource indicator (URI) that includes at least a routing identifier to the first device and a section routing identifier to the second file stored memory device on the first device. At 110 the hardware controller stores a revised version of the first file to the cloud storage system, wherein the confidential portion of the first file is replaced with the generated uniform resource indicator within the revised version of the first file at a location of the confidential portion within the content of first file.

Figure 5:
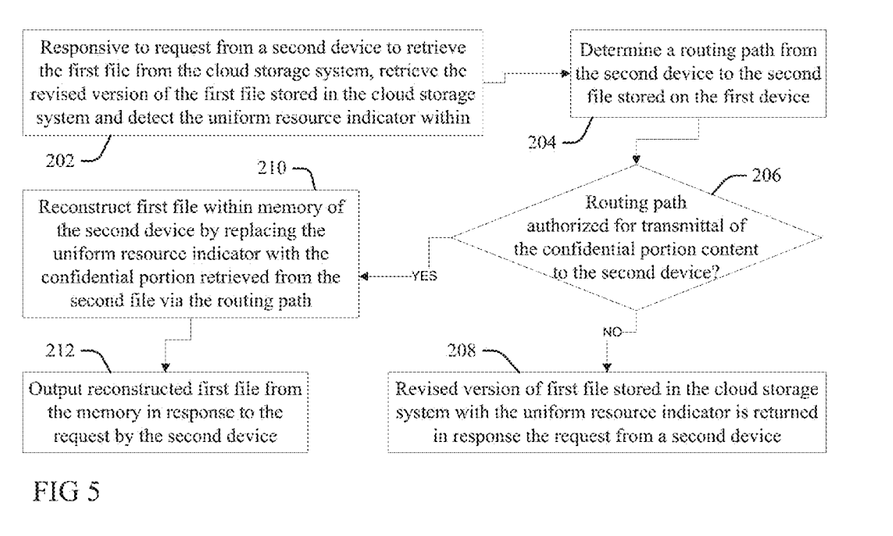
FIG. 5 is a flow chart illustration of another aspect of selective allocation of file content portions between cloud system and hardware devices.

FIG. 5 illustrates an aspect of selective processing of the first and second files according to the present invention. At 202, responsive to receiving a request from a second device to retrieve the first file from the cloud storage system, the revised version of the first file stored in the cloud storage system is retrieved and the uniform resource indicator in the revised version detected. At 204 a routing path from the second device to the second file stored on the first device is determined.

At 206 the process determines whether the determined routing path is authorized for transmittal of the confidential portion content to the second device. Examples of authorization include pairing the first and second devices via a wired or wireless circuit connection (for example, a pairing via Bluetooth® or WiFi communications). (BLUETOOTH is a trademark of Bluetooth SIG in the United States or other countries.) Thus, the determination at 206 may determine whether the second device is authorized to interact with the first device by a previous pairing by authenticating credentials of a second device with the first device that were established by a previous pairing (for example, via cookies or other code artifacts which are stored on at least one of the first and second device during the previous pairing).

If not authorized at 206, then at 208 the revised version of the first file stored in the cloud storage system with the uniform resource indicator is returned in response to the request from a second device to retrieve the first file from the cloud storage system. Otherwise, in response to determining at 206 that the routing path is authorized for transmittal of the confidential portion content to the second device, at 210 the first file is reconstructed within the memory of the second device by replacing the uniform resource indicator with the confidential portion retrieved from the second file via the routing path, and the reconstructed first file is output from the memory in response to the request by the second device to retrieve the first file from the cloud storage system at 212.

Figure 6:
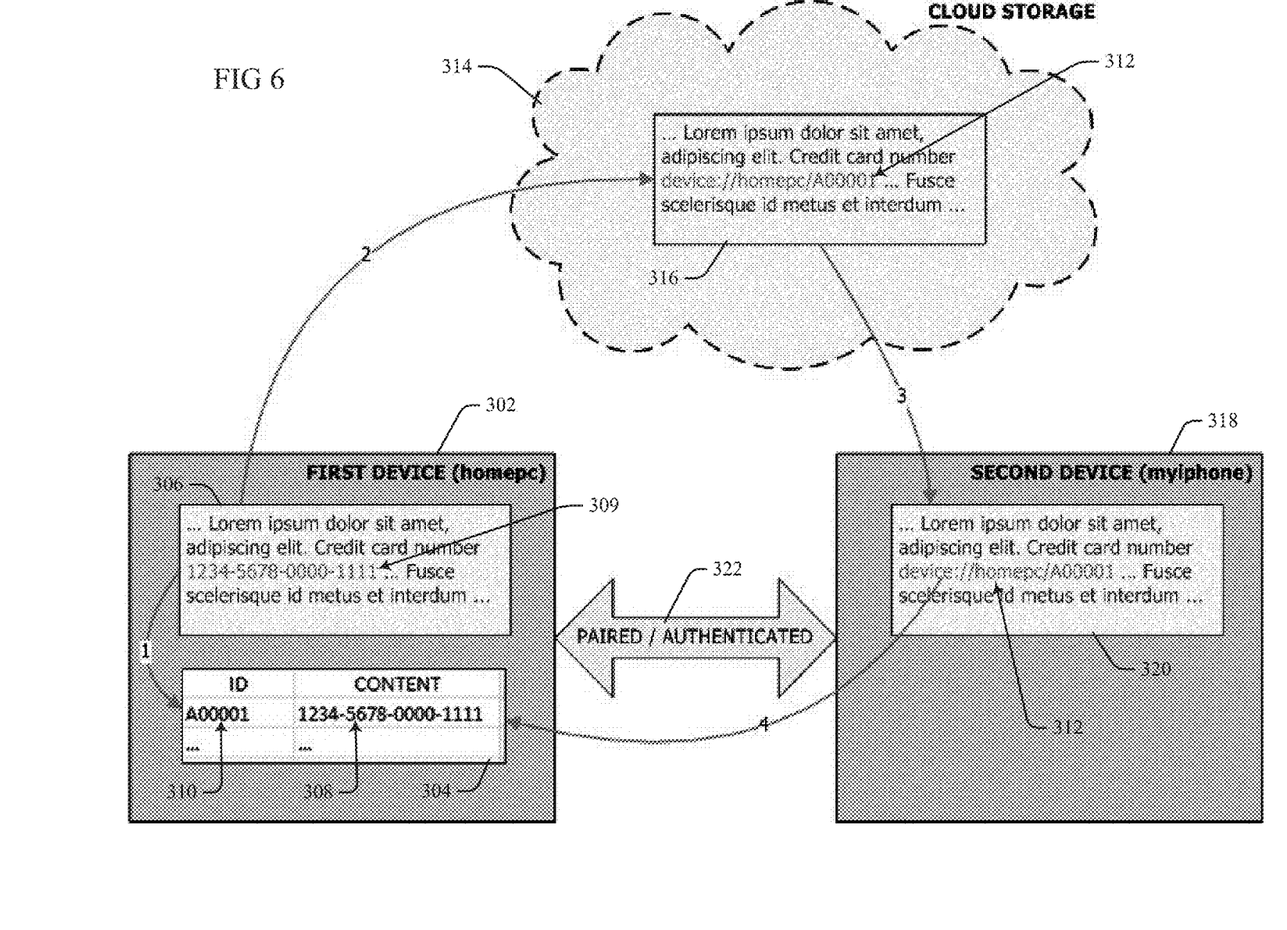
FIG. 6 is a block diagram illustration of a method or process for the selective allocation of file content portions between cloud systems and hardware devices.

FIG. 6 provides a diagrammatic illustration of an implementation of the process and system of FIGS. 4 and 5. A user on a first device ("homepc") 302 identifies a credit card number 308 as a confidential portion or section of a first file 306 that should not be transmitted to the cloud storage instance. The method or process executed on the homepc 302 stores this section 308 locally as another file 304 on the device, and assigns a unique ID (A00001) 310 to the location of the stored section 308.

The content of the original file 306 is modified and saved to a cloud storage medium 314 as modified version 312 of the original file 306 content wherein the confidential content 309 is replaced with a URI handle ("device://homepc/A00001") 312 that identifies the first device 302 and the location 310 thereon of the stored confidential content 308.

The modified file content 316 is retrieved from the cloud storage 314 and as instance 320 on a second device ("myiphone") 318. In the present example the first device 302 and the second device 318 are paired and synched via a circuit connection 322, which authenticates the second device 318. Accordingly, a processor executing code on the second device 318 extracts the URI handle 312 from the instance 320 downloaded from the cloud storage 314 and resolves it to the section 304 (via the location information "A00001" 310) that is stored on the first device 302 and replaces the URI 312 within the instance 320 the confidential content 308 stored on the first device 302.

Thus, aspects of the present invention provide methods to enable cloud storage of content while further enabling users to avoid storing all content of a specific document in the cloud. In the example described above, the specific section of content is confidential and should not be stored on the cloud, while the remainder of the content is not confidential, though other criteria may be used to select the respective cloud and second file portions. Aspects enhance security and confidentiality by providing for mechanisms to retrieve documents from cloud storage and then resolve confidential portions of that document from another device. Cloud storage can be used without compromising security, and cloud documents can be fully reconstructed using only secure devices.

Referring again to FIG. 6, in some aspects users may choose to pre-synch the first device 302 and the second device 318 prior to or during storage of the modified file content instance 316 within the cloud storage 314. In some examples, the pre-synch stores cookies or other files in each of the first and second devices, wherein a determination that such cookies are present when the devices are subsequently synched again provides verification that the second device is authorized and that the connection 322 between the two is therefore valid.

The first device 302 may also push the confidential section content 309 to the second device 318 prior to or during saving to the second file location 304, if the second device 318 is reachable via the authentication link 322. Thus, the second device 318 may store the confidential content in a third file location (not shown) on the second device that is resolved by the URI 312 of the file instance 320 downloaded from the cloud storage 314.

Separate services provided by the infrastructure at the first device 302, the second device 318 or within a manager of the cloud storage 314 to manage both pre and the post synch operations.

Users may also forbid a synch to the second device 318 under certain conditions. For example, if the connection 322 between the two devices or to the cloud storage 314 are determined to be public, non-secure links or integrated into a cloud service, the sync may be forbidden in any case, or with respect to only some or certain designated confidential content items 309 (e.g. a social security number) that are designated for restriction to transmittal over only non-public, secure link communications, and wherein other items may be synced over a public network (e.g. a personal email address). In this fashion, aspects enable additional user control as to the types of data and types of network connections are suitable for transmitting designated or determined confidential data items 309, 308, via controlled methods that are not integrated into the cloud service.

Aspects may also automatically detect and/or propose to user confidential content sections 309 to be excluded from Cloud Storage. A hardware controller may apply a set of patterns in a matching process against the content of file documents 306, or certain sections thereof, to determine if content within the file (or sections thereof) are likely to be confidential portions 309. For example, the system may match or look for specific keywords such as "confidential", "secret", etc., within the file 306 content and propose sections containing such keywords as confidential portions 309.

In another example, the proposed system may look at words or other string text selections that are flagged by a system spell checker as not matching terms defined within a dictionary database. In some examples, string text or words within a certain range of a number of specified characters (e.g., more than six but less than twelve), may be determined as likely or good candidates to be passwords or other confidential information 309, and the system might propose or automatically mark them for replacement with URI's as described above.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selective allocation of file content portions between cloud and secured hardware device storage mediums, the method comprising:

responsive to receiving a request to store a first file to a cloud storage system, wherein the request comprises a confidential portion of content of the first file that is designated as confidential, and a remainder portion of content of the first file that is different from the confidential portion and is not designated as confidential, a hardware controller on a first device component that is in network communication with a cloud storage system:

storing the confidential portion of the first file as a second file on the first device;

generating a uniform resource indicator that comprises at least a routing identifier to the first device, and a section routing identifier to the second file stored on the first device;

storing a revised version of the first file to the cloud storage system wherein the confidential portion of the first file is replaced with the generated uniform resource indicator within the revised version of the first file at a location of the confidential portion of content of the first file; and responsive to receiving a request from a second device to retrieve the first file from the cloud storage system, and to determining that a cookie generated in response to synching the second device to the first device is present and stored on both of the first device and the second device during the storing of the revised version of the first file to the cloud storage system, enabling the second device to retrieve the confidential portion from the second file via an authorized routing path and to reconstruct the first file by replacing the uniform resource indicator located within the revised version of the first file with the confidential portion retrieved from the second file.

2. The method of claim 1, wherein the hardware controller comprises a processor that is in circuit communication with a computer readable memory and a computer readable storage medium, the method further comprising:

integrating computer readable program code into the computer readable storage medium; and wherein the processor executes instructions of the program code integrated on the computer readable storage medium via the computer readable memory and thereby performs the steps of storing the confidential portion of the first file as the second file on the first device, generating the uniform resource indicator, storing the revised version of the first file to the cloud storage system wherein the confidential portion of the first file is replaced with the generated uniform resource indicator within the revised version of the first file at the location of the confidential portion within the content of the first file, and responsive to receiving the request from the second device to retrieve the first file from the cloud storage system, and to determining that the cookie generated in response to synching the second device to the first device is present and stored on both of the first device and the second device during the storing of the revised version of the first file to the cloud storage system, enabling the second device to retrieve the confidential portion from the second file via the authorized routing path and to reconstruct the first file by replacing the uniform resource indicator located within the revised version of the first file with the confidential portion retrieved from the second file.

3. The method of claim 1, wherein the uniform resource indicator comprises another routing identifier to a third device, and another section routing identifier to a third file stored on the third device that is different from the section routing identifier to the second file stored on the first device, the method further comprising:

pushing the confidential portion to the third device prior to or during the saving of the revised version of the first file to the cloud storage system in response to determining that the third device is reachable via communication with the first device;

saving the pushed confidential portion to a third file location on the third device; and reconstructing the first file on the third device by replacing the uniform resource indicator located within the revised version of the first file that is downloaded onto the third device from the cloud storage system with the pushed confidential portion retrieved from the third file as a function of the uniform resource indicator.

4. The method of claim 1, further comprising:

designating the confidential portion of content of the first file as confidential as a function of matching the confidential portion of content of the first file to at least one confidential string text pattern.

5. The method of claim 1, further comprising:

responsive to determining that the routing path from the second device to the second file stored on the first device is not authorized, outputting the retrieved revised version of the first file from the memory to the second device in response to the request from the second device to retrieve the first file from the cloud storage system.

6. The method of claim 5, further comprising:

determining that the routing path from the second device to the second file stored on the first device is not authorized in response to recognizing that the routing path of the second device to the first device is at least one of a public link, a non-secure link and a link that is integrated into a cloud service.

7. A system, comprising:

a processor on a first device component that is in network communication with a cloud storage system;

a computer readable memory in circuit communication with the processor; and a computer readable storage medium in circuit communication with the processor;

wherein the processor executes program instructions stored on the computer readable storage medium via the computer readable memory and thereby, in response to receiving a request to store a first file to the cloud storage system, wherein the request comprises a confidential portion of content of the first file that is designated as confidential, and a remainder portion of content of the first file that is different from the confidential portion and is not designated as confidential:

stores the confidential portion of the first file as a second file on the first device;

generates a uniform resource indicator that comprises at least a routing identifier to the first device, and a section routing identifier to the second file stored on the first device;

stores a revised version of the first file to the cloud storage system wherein the confidential portion of the first file is replaced with the generated uniform resource indicator within the revised version of the first file at a location of the confidential portion of content of the first file; and responsive to receiving a request from a second device to retrieve the first file from the cloud storage system, and to determining that a cookie generated in response to synching the second device to the first device is present and stored on both of the first device and the second device during the storing of the revised version of the first file to the cloud storage system, enables the second device to retrieve the confidential portion from the second file via an authorized routing path and to reconstruct the first file by replacing the uniform resource indicator located within the revised version of the first file with the confidential portion retrieved from the second file.

8. The system of claim 7, wherein the uniform resource indicator comprises another routing identifier to a third device, and another section routing identifier to a third file stored on the third device that is different from the section routing identifier to the second file stored on the first device, and wherein the processor executes the program instructions stored on the computer readable storage medium via the computer readable memory and thereby further:

pushes the confidential portion to the third device prior to or during saving of the revised version of the first file to the cloud storage system in response to determining that the third device is reachable via communication with the first device;

saves the pushed confidential portion to a third file location on the third device; and enables the third device to reconstruct the first file by replacing the uniform resource indicator located within the revised version of the first file that is downloaded onto the third device from the cloud storage system with the confidential portion pushed to the third file as a function of the uniform resource indicator.

9. The system of claim 7, wherein the processor executes the program instructions stored on the computer readable storage medium via the computer readable memory and thereby further determines that the confidential portion of content of the first file is designated as confidential by matching content of the confidential portion of content of the first file to at least one confidential string text pattern.

10. The system of claim 7, wherein the processor executes the program instructions stored on the computer readable storage medium via the computer readable memory and thereby:

responsive to determining that the routing path from the second device to the second file stored on the first device is not authorized, outputs the retrieved revised version of the first file from the memory to the second device in response to the request from the second device to retrieve the first file from the cloud storage system.

11. The system of claim 10, wherein the processor executes the program instructions stored on the computer readable storage medium via the computer readable memory and thereby determines that the routing path from the second device to the second file stored on the first device is not authorized in response to recognizing that the routing path of the second device to the first device is at least one of a public link, a non-secure link and a link that is integrated into a cloud service.

12. A computer program product for selective allocation of file content portions between cloud and secured hardware device storage mediums, the computer program product comprising:

a computer readable storage medium having computer readable program code embodied therewith, wherein the computer readable storage medium is not a transitory medium per se, the computer readable program code comprising instructions for execution by a processor on a first device in communication with a cloud storage system that cause the processor to, in response to receiving a request to store a first file to the cloud storage system, wherein the request comprises a confidential portion of content of the first file that is designated as confidential, and a remainder portion of content of the first file that is different from the confidential portion and is not designated as confidential:

store the confidential portion of the first file as a second file on the first device;

generate a uniform resource indicator that comprises at least a routing identifier to the first device, and a section routing identifier to the second file stored on the first device;

store a revised version of the first file to the cloud storage system wherein the confidential portion of the first file is replaced with the generated uniform resource indicator within the revised version of the first file at a location of the confidential portion of content of the first file; and responsive to receiving a request from a second device to retrieve the first file from the cloud storage system, and to determining that a cookie generated in response to synching the second device to the first device is present and stored on both of the first device and the second device during the storing of the revised version of the first file to the cloud storage system, enable the second device to retrieve the confidential portion from the second file via an authorized routing path and to reconstruct the first file by replacing the uniform resource indicator located within the revised version of the first file with the confidential portion retrieved from the second file.

13. The computer program product of claim 12, wherein the uniform resource indicator comprises another routing identifier to a third device, and another section routing identifier to a third file stored on the third device that is different from the section routing identifier to the second file stored on the first device, and wherein the computer readable program code instructions for execution by the processor further cause the processor to:

push the confidential portion to the third device prior to or during saving of the revised version of the first file to the cloud storage system in response to determining that the third device is reachable via communication with the first device;

save the pushed confidential portion to a third file location on the third device; and enable the third device to reconstruct the first file by replacing the uniform resource indicator located within the revised version of the first file that is downloaded onto the third device from the cloud storage system with the confidential portion pushed to the third file as a function of the uniform resource indicator.

14. The computer program product of claim 12, wherein the computer readable program code instructions for execution by the processor further cause the processor to determine that the confidential portion of content of the first file is designated as confidential by matching content of the confidential portion of content of the first file to at least one confidential string text pattern.

15. The computer program product of claim 12, wherein the computer readable program code instructions for execution by the processor further cause the processor to:
   responsive to determining that the routing path from the second device to the second file stored on the first device is not authorized, output the retrieved revised version of the first from the memory to the second device in response to the request from the second device to retrieve the first file from the cloud storage system.

16. The computer program product of claim 15, wherein the computer readable program code instructions for execution by the processor further cause the processor to determine that the routing path from the second device to the second file stored on the first device is not authorized in response to recognizing that the routing path of the second device to the first device is at least one of a public link, a non-secure link and a link that is integrated into a cloud service.

\* \* \* \* \*